United States Patent
LoRicco et al.

(10) Patent No.: US 10,443,401 B2
(45) Date of Patent: Oct. 15, 2019

(54) COOLED TURBINE VANE WITH ALTERNATELY ORIENTATED FILM COOLING HOLE ROWS

(71) Applicant: United Technologies Corporation, Farmington, CT (US)

(72) Inventors: Nicholas M. LoRicco, Windsor, CT (US); Mark A. Boeke, Plainville, CT (US); Richard M. Salzillo, Jr., Plantsville, CT (US); Jeffrey J. DeGray, Somers, CT (US)

(73) Assignee: United Technologies Corporation, Farmington, CT (US)

( * ) Notice: Subject to any disclaimer, the term of this patent is extended or adjusted under 35 U.S.C. 154(b) by 408 days.

(21) Appl. No.: 15/255,187

(22) Filed: Sep. 2, 2016

(65) Prior Publication Data

US 2018/0066524 A1 Mar. 8, 2018

(51) Int. Cl.
*F01D 5/18* (2006.01)
*F01D 25/12* (2006.01)

(52) U.S. Cl.
CPC ............. *F01D 5/187* (2013.01); *F01D 5/186* (2013.01); *F01D 25/12* (2013.01); *F05D 2220/32* (2013.01); *F05D 2230/10* (2013.01); *F05D 2230/21* (2013.01); *F05D 2260/202* (2013.01); *F05D 2260/221* (2013.01); *Y02T 50/676* (2013.01)

(58) Field of Classification Search
CPC .. F05D 2260/221; F05D 2260/20; F01D 5/00; F01D 5/18; F01D 5/181; F01D 5/186; F01D 5/187; F01D 5/20; Y02T 50/676
USPC .......................................... 415/115; 416/97 R
See application file for complete search history.

(56) References Cited

U.S. PATENT DOCUMENTS 3,901,626 A * 8/1975 McMurtry ............... F01D 7/00
                                                416/157 A
5,326,224 A   7/1994 Lee et al.
(Continued)

FOREIGN PATENT DOCUMENTS

EP       1126135 A2    8/2001

OTHER PUBLICATIONS

European Search Report for European Application No. 17189120.3, dated Jan. 31, 2018.

*Primary Examiner* — David E Sosnowski
*Assistant Examiner* — Maranatha Boardman
(74) *Attorney, Agent, or Firm* — Carlson, Gaskey & Olds, P.C.

(57) ABSTRACT

A cooled component for a gas turbine engine includes a plurality of internal ribs extending substantially parallel to a longitudinal axis of the gas turbine engine. The internal ribs are disposed within an internal cavity defining cooling air passages within the cooled component. A plurality of cooling holes are arranged in rows with axial orientations alternating between a radially outboard bias directing cooling air radially outward and a radially inboard bias directing cooling air radially inward. Each of the cooling holes includes an internal opening in communication with one of the cooling air passages and an external opening open to an outer surface of the cooled component. The external opening of each of the plurality of cooling holes is disposed on a side opposite the internal rib relative to a corresponding internal opening. A gas turbine engine and a method of fabricating a turbine airfoil are also disclosed.

20 Claims, 3 Drawing Sheets

(56) References Cited

U.S. PATENT DOCUMENTS

| | | | | |
|---|---|---|---|---|
| 5,419,681 A * | 5/1995 | Lee | ............... | F01D 5/186 |
| | | | | 415/115 |
| 6,164,912 A * | 12/2000 | Tabbita | ............ | F01D 5/186 |
| | | | | 416/97 R |
| 6,183,199 B1 * | 2/2001 | Beeck | ............ | F01D 5/186 |
| | | | | 416/97 R |
| 6,325,593 B1 * | 12/2001 | Darkins, Jr. | ............ | F01D 5/186 |
| | | | | 415/115 |
| 6,979,176 B2 * | 12/2005 | Nakamata | ............ | F01D 5/186 |
| | | | | 416/97 R |
| 7,186,085 B2 | 3/2007 | Lee | | |
| 7,328,580 B2 | 2/2008 | Lee et al. | | |
| 7,682,132 B2 | 3/2010 | Sugimoto et al. | | |
| 7,997,868 B1 | 8/2011 | Liang | | |
| 8,128,366 B2 | 3/2012 | Strock et al. | | |
| 8,905,713 B2 | 12/2014 | Bunker et al. | | |
| 9,279,330 B2 | 3/2016 | Xu et al. | | |
| 10,041,356 B2 * | 8/2018 | Lewis | ............ | F01D 5/186 |
| 2007/0109743 A1 | 5/2007 | Sugimoto et al. | | |
| 2014/0010632 A1 | 1/2014 | Spangler et al. | | |
| 2016/0003054 A1 | 1/2016 | Dierberger | | |
| 2016/0076451 A1 | 3/2016 | McBrien et al. | | |

* cited by examiner

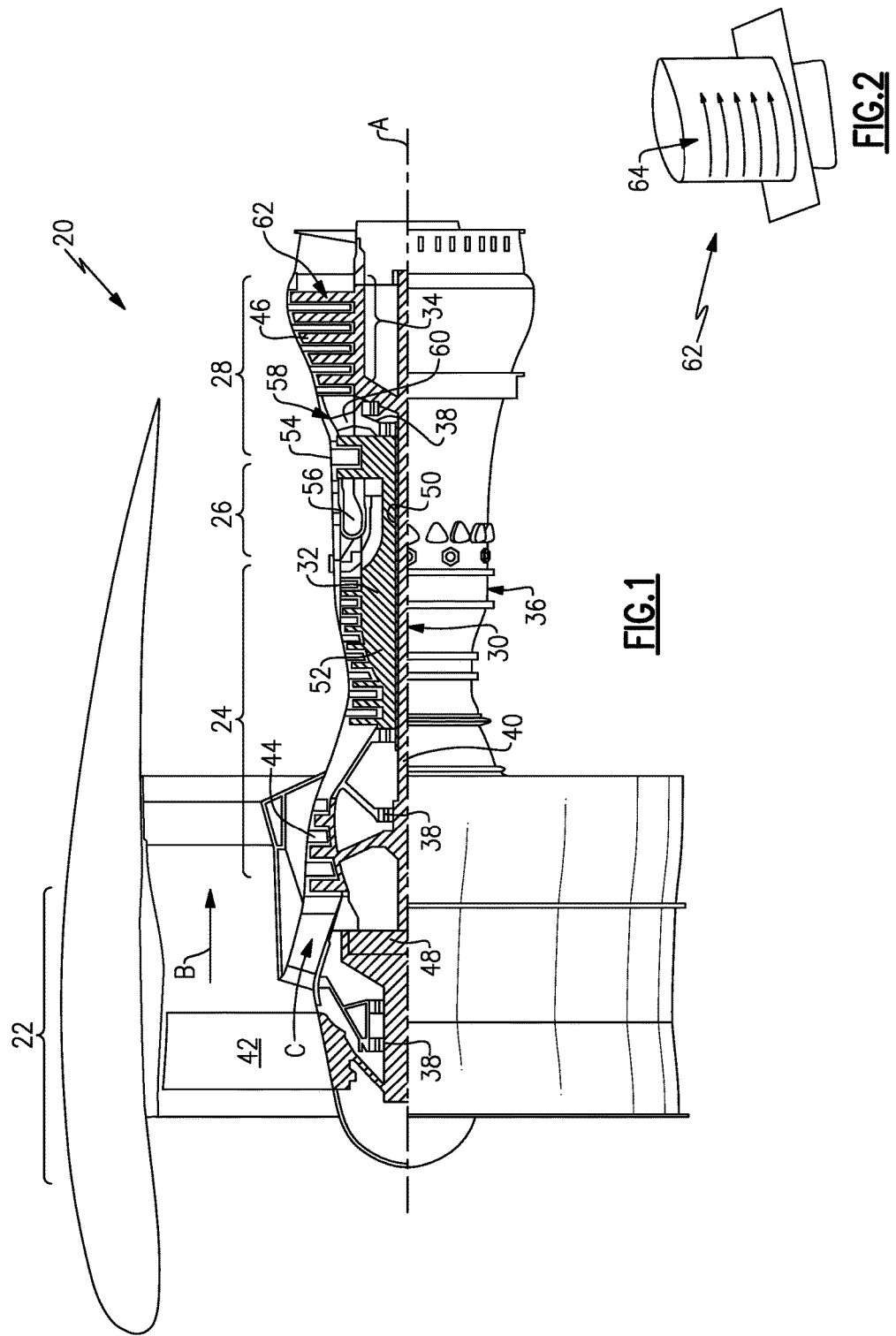

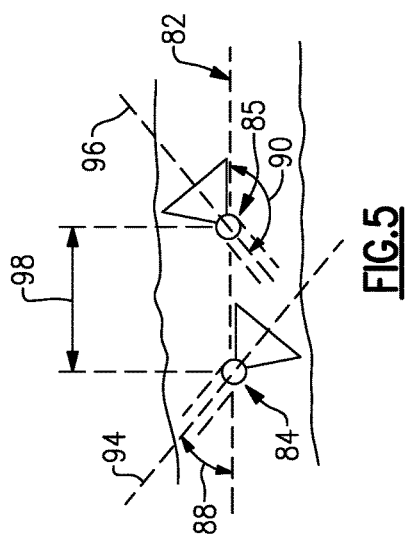
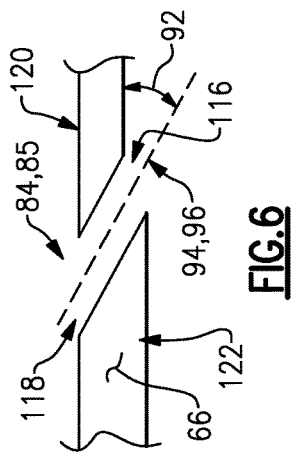
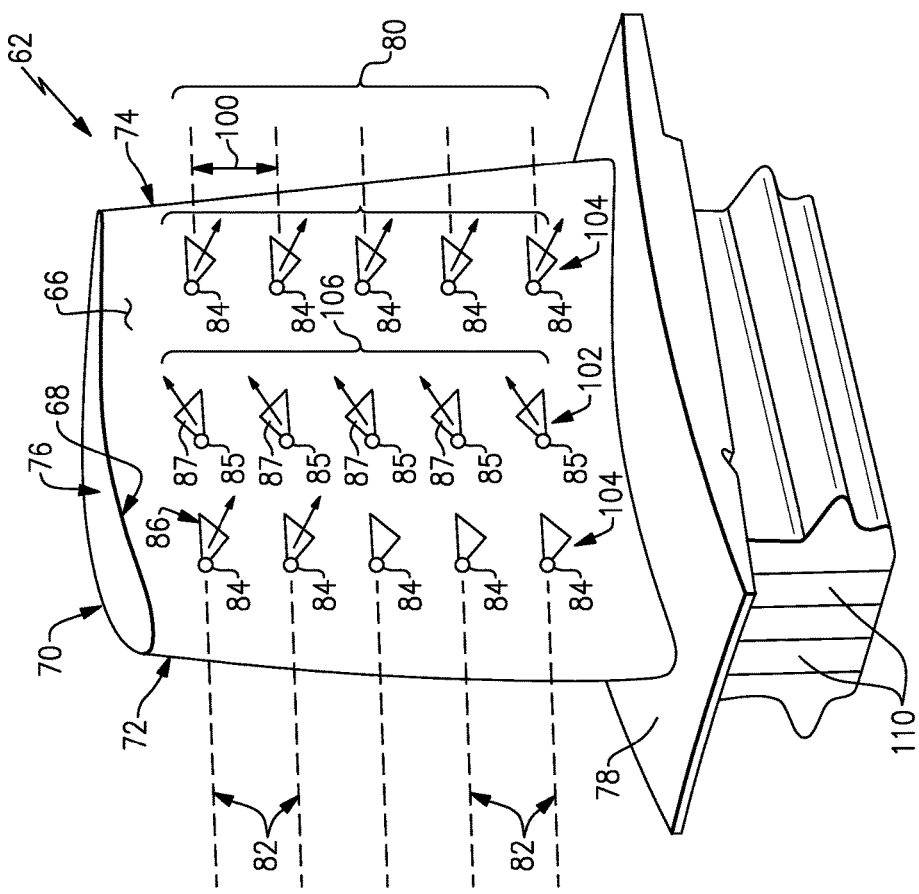

COOLED TURBINE VANE WITH ALTERNATELY ORIENTATED FILM COOLING HOLE ROWS

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-energy exhaust gas flow expands through the turbine section to drive the compressor and the fan section. The compressor section typically includes low and high pressure compressors, and the turbine section includes low and high pressure turbines.

Operating temperatures within portions of the engine such as the turbine section can exceed material capabilities. Cooling airflow is therefore provided to components such as blades and vanes. Cooling airflow is obtained from the other parts of the engine such as the compressor section and therefore impact overall engine efficiency and is therefore applied sparingly throughout the various engine components. Cooling airflow within a turbine blade or vane is provided through film cooling holes that inject air over the airfoil surface to partially insulate the blade from the extreme temperatures of the high energy exhaust gas flow. The orientation of the film cooling holes is a controlling factor in both cooling airflow management and effectiveness.

Turbine engine manufacturers continue to seek further improvements to engine performance including improvements to thermal, transfer and propulsive efficiencies.

SUMMARY

In a featured embodiment, a cooled component for a gas turbine engine includes a plurality of internal ribs extending substantially parallel to a longitudinal axis of the gas turbine engine. The internal ribs are disposed within an internal cavity defining cooling air passages within the cooled component. A plurality of cooling holes are arranged in rows with axial orientations alternating between a radially outboard bias directing cooling air radially outward and a radially inboard bias directing cooling air radially inward. Each of the cooling holes includes an internal opening in communication with one of the cooling air passages and an external opening open to an outer surface of the cooled component. The external opening of each of the plurality of cooling holes is disposed on a side opposite the internal rib relative to a corresponding internal opening.

In another embodiment according to the previous embodiment, cooling holes within each of the rows are disposed along a common centerline.

In another embodiment according to any of the previous embodiments, an outboard radial bias angle from the common centerline for a radially outboard biased cooling hole is equal and opposite an inboard radial bias angle relative to the common centerline for a radially inboard biased cooling hole.

In another embodiment according to any of the previous embodiments, at least two cooling holes disposed along a common centerline include a common surface angle.

In another embodiment according to any of the previous embodiments, the cooled component includes an airfoil defining a surface between a leading edge and a trailing edge. The airfoil extends radially relative to an engine centerline and the rows extend substantially parallel to the engine centerline.

In another embodiment according to any of the previous embodiments, the rows are spaced apart radially between a tip of the airfoil and a platform.

In another embodiment according to any of the previous embodiments, including a diffuser extending from at least some of the plurality of cooling holes. The diffuser alternates between a radially outboard bias and a radially inboard bias corresponding to a bias of the corresponding one of the plurality of cooling holes.

In another embodiment according to any of the previous embodiments, the diffuser includes a diverging shape extending outward from the corresponding one of the plurality of cooling holes.

In another embodiment according to any of the previous embodiments, at least one of the plurality of cooling holes includes one of a round shape, an oval shape and a rectangular shape.

In another featured embodiment, a gas turbine engine includes a turbine section disposed about an engine centerline including a rotating turbine blade and a fixed turbine vane. At least one of the turbine blade and the turbine vane include an airfoil defining a surface between a leading edge and a trailing edge. A plurality of internal ribs are disposed within an internal cavity of the airfoil and extend substantially parallel to a longitudinal axis of the gas turbine engine. The internal ribs define cooling air passages within the airfoil. A plurality of cooling holes are arranged in rows with axial orientations alternating between a radially outboard bias directing cooling air radially outward and a radially inboard bias directing cooling air radially inward. Each of the plurality of cooling holes includes an internal opening in communication with one of the cooling air passages and an external opening through the surface of the airfoil. The external opening breaking through the surface of the airfoil is disposed on a side opposite an internal rib forming one of the cooling air passages.

In another embodiment according to the previous embodiment, cooling holes within each of the rows are disposed along a common centerline.

In another embodiment according to any of the previous embodiments, an outboard radial bias angle from the common centerline for a radially outboard biased cooling hole is equal and opposite an inboard radial bias angle relative to the common centerline for a radially inboard biased cooling hole.

In another embodiment according to any of the previous embodiments, the rows extend substantially parallel to the engine centerline.

In another embodiment according to any of the previous embodiments, the gas turbine engine further includes a fan driven through a geared architecture by the turbine section.

Another embodiment according to any of the previous embodiments, includes a diffuser extending from at least some of the plurality of cooling holes. The diffuser extends from the corresponding cooling hole in a direction alternating between a radially outboard bias and a radially inboard bias corresponding to a bias of the corresponding one of the plurality of cooling holes.

In another embodiment according to any of the previous embodiments, each of the plurality of cooling holes includes one of a round shape, an oval shape and a rectangular shape.

In another featured embodiment, a method of fabricating a turbine airfoil includes forming an airfoil including a pressure side. A suction side extends between a leading edge and a trailing edge. An internal cavity is formed for cooling air flow including axially extending internal ribs defining cooling air passages. Holes formed within the airfoil in a row extend from the leading edge toward the trailing edge along a common centerline. Each of the holes includes an internal opening in communication with a cooling air passage and an external opening open to an outer surface of the airfoil. The external opening is formed such that is disposed on a side opposite internal ribs relative to the internal opening. Openings angled within each row to alternate a radial bias of cooling airflow above and below the common centerline.

Another embodiment according to the previous embodiment, includes forming openings with an outboard radial bias angle directing airflow above the common centerline adjacent to an opening with an inboard radial bias angle directing airflow below the common centerline.

Another embodiment according to any of the previous embodiments, includes forming a plurality of rows spaced radially apart between a platform of the airfoil and a tip of the airfoil.

Another embodiment according to any of the previous embodiments, includes forming at least two openings within one of the rows to include a common radial bias angle.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 1 schematically shows an embodiment of a gas turbine engine.

FIG. 2 schematically shows cooling airflow across a turbine blade of the example gas turbine engine.

FIG. 3 illustrates a turbine blade including cooling air holes.

FIG. 5 is a schematic view of an example cooling air holes.

FIG. 6 is a cross section of example cooling air holes.

DETAILED DESCRIPTION

Figure 4:
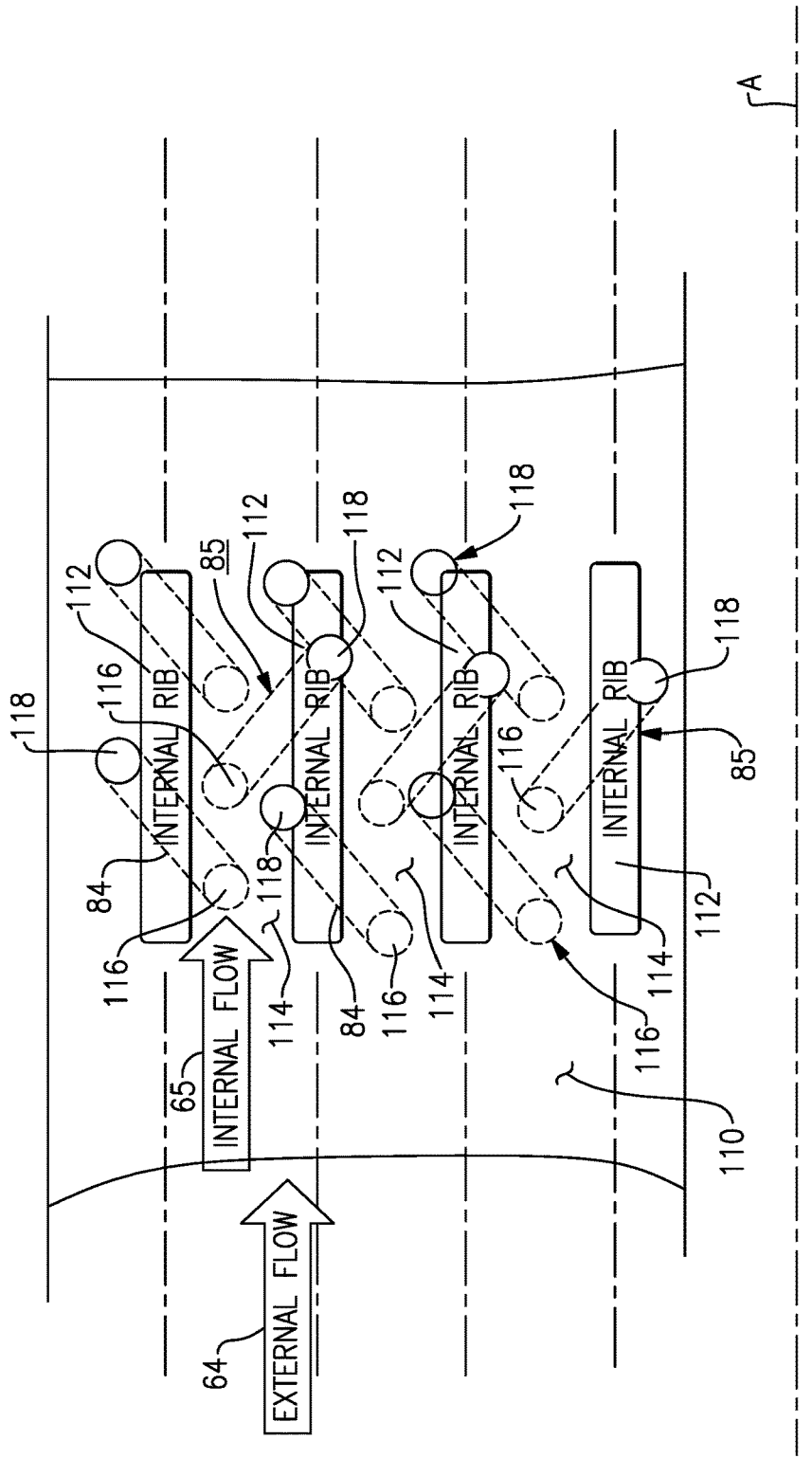
FIG. 4 is a schematic view of example internal cavity and internal ribs of a turbine blade embodiment.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high-energy exhaust gas stream that expands through the turbine section 28 where energy is extracted and utilized to drive the fan section 22 and the compressor section 24.

Although the disclosed non-limiting embodiment depicts a two-spool turbofan gas turbine engine, it should be understood that the concepts described herein are not limited to use with two-spool turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

Airflow through the core airflow path C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/(518.7°\ R)]^{0.5}$. The "Low corrected fan tip speed", as disclosed herein according to one non-limiting embodiment, is less than about 1150 ft/second.

The example gas turbine engine includes the fan section 22 that comprises in one non-limiting embodiment less than about 26 fan blades 42. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Gas turbine engines designs are seeking to increase overall efficiency by generating higher speeds and pressures. By achieving increased speeds and pressures, increased levels of performance and efficiency may be achieved. However, challenges are raised in that the parts and components associated with higher pressures and speeds require additional cooling air to maintain temperatures within material capabilities.

Efficiency is a priority for gas turbine engine manufacturers and includes the desire to improve turbine efficiency. The turbine section receives high energy gas flow at a temperature substantially above the material capabilities of structures disposed within the turbine section. Accordingly, each of the turbine blades and turbine vanes disposed within the engine section are cooled by a cooling airflow. The cooling airflow is obtained from the compressor section and directed to a component within the turbine section.

Referring to FIG. 2 with continued reference to FIG. 1, one such component within a turbine section 28 is a turbine blade indicated at 62. Cooling airflow schematically shown at 64 is provided over the airfoil to maintain the material of the turbine within material capabilities such that the turbine airfoils will meet the performance and life span targets. The amount of cooling airflow that is extracted from the compressor section and provided to the turbine section impacts overall compressor and therefore engine efficiency. Accordingly, it is desirable to minimize the amount of cooling air that is required in the turbine section while also maintaining operational efficiencies.

Film cooling patterns are configured to efficiently utilize the cooling airflow. Film cooling holes may be cast into the vane or machined in a process such as laser or electron discharge machining operations. The disclosed example turbine blade 62 includes a plurality of cooling film holes 84 orientated in a manner to more efficiently utilize film cooling air.

It should be appreciated that although a turbine blade is disclosed and described by way of example, the features disclosed herein are applicable to both rotating and fixed airfoils such as turbine blades and turbine vanes and also may be applied to other cooled components within the turbine section or other parts of the gas turbine engine that require film air cooling.

Referring to FIG. 3, an example turbine blade 62 includes an airfoil 66. The airfoil 66 includes a suction side 68, a pressure side 70, a leading edge 72 and a trailing edge 74. The airfoil 66 extends between the leading edge 72 and the trailing edge 74 between a tip 76 and a platform 78. A plurality of cooling air holes 84, 85 are arranged along the surface of the airfoil 66. The disclosed airfoil 66 includes an orientation and arrangement of film cooling holes 84, 85 that reduces the amount of cooling air required to maintain the turbine airfoil 66 within acceptable temperature ranges.

Referring to FIG. 4, with continued references to FIG. 3, the example turbine blade 62 includes an internal cavity 110 shown schematically in FIG. 3. The internal cavity 110 includes internal ribs 112 that define cooling air passages 114. An internal cooling air flow schematically shown at 65 flows axially through the passages 114. The schematic view is provided to illustrate the configuration of each cooling air hole 84, 85. Each cooling air hole 84, includes an internal opening 116 that opens to the internal cavity 110. The internal opening 116 is shown schematically as a broken line in FIG. 4 as it is within the cavity and not on the outer surface of the airfoil 66. Each cooling air hole 84, 85 further includes an external opening 118 that opens through the outer surface of the airfoil 66. The external opening 118 is shown in solid lines as it opens to the outer surface of the airfoil 66. The holes 84, 85 are indicated by dashed lines as they each extend through the wall of the airfoil to supply air cooling air along the outer surface of the airfoil.

The internal ribs 112 extend axially substantially parallel to the engine axis A. The corresponding cooling air passage 114 also extend parallel to the engine axis A. Internal openings 116 for each of the holes 84, 85 break out into the internal cavity 110 within one of the cooling air passages 114. Accordingly, the internal openings 116 are aligned within a row corresponding with one of the cooling air passages 114. The holes 84, 85 alternate such that the external opening 118 of each hole 84, 85 breaks through an outer surface 120 (FIG. 6) of the airfoil 66 on a side of the internal passage opposite the corresponding internal rib 112.

In other words, each of the holes 84, 85 at least partially crosses over one of the internal ribs 112 as is illustrated in FIG. 4.

Each of the holes 84, 85 includes the internal opening 116 that opens on an internal side 122 of the airfoil 66 and the external opening 118 that breaks through the airfoil 66 on the outer surface 120 of the airfoil 66. Between the internal opening 116 and the external opening 118, each hole 84, 85 crosses over one of the internal ribs 112 to provide the desired direction and angle of cooling airflow along the outer surface 120 of the airfoil 66.

The holes 84, 85 are round, but may be oval or rectangular. Similarly, the corresponding internal openings 116 and external openings 118 may be round, oval or rectangular. Moreover, other shapes for both the holes 84, 85 and the openings 116, 118 are within the contemplation of this disclosure.

Referring to FIGS. 5 and 6 with continued reference to FIGS. 3 and 4, the example cooling air holes 84, 85 are arranged in rows 80 that are evenly spaced radially between the platform 78 and the tip 76. Specifically, the internal openings 116 for each of the holes 84, 85 are arranged in rows 80. The corresponding external openings 118 for each of the holes 84, 85 may be angled or offset relative to an adjacent external opening 118. Moreover, the external openings 116 may also be arranged in evenly spaced rows. In this example, each of the rows 80 are disposed along a corresponding common centerline 82 spaced a radial distance 100 apart. Although the example rows 80 are evenly spaced, other radial spacing is within the contemplation of this disclosure.

In this example, the cooling air holes 84, 85 are arranged along a common centerline 82. Each of the cooling air holes 84, 85 along each row 80 are orientated in an alternating fashion to direct cooling air above and below the common centerline 82. In the disclosed example, a first cooling air hole 84 includes a diffuser 86 and directs airflow radially inboard relative to the common centerline 82. In the disclosed example, the diffuser 86 is a diverging shape that extends outward from the corresponding cooling hole. The diffusers 86 alternate between a radially outboard bias and a radially inboard bias corresponding to a bias of the corresponding cooling air holes 84, 85. An adjacent cooling air hole 85 directs cooling air above the common centerline 82. The subsequent cooling air hole 84 directs airflow below the common centerline 82.

Accordingly, each of the rows 80 include a plurality of cooling air openings 84, 85 that alternately direct airflow above and below the common centerline 82 for each row 80. By alternating the orientation of the cooling holes 84, 85, coverage of airflow from the cooling holes is improved without increasing the amount of cooling airflow required.

In the disclosed example embodiment, the first cooling holes 84 in each row indicated at 104 direct airflow downward or radially inboard. The second or middle row in the illustrated example shown at 102 includes an outward radial bias. As appreciated, although only three cooling holes are illustrated for each of the plurality of rows 80, any number of cooling holes 84, 85 could be utilized depending on the airfoil configuration and cooling air needs for a specific turbine airfoil 66.

The radially inboard biased cooling air holes 84 include an inboard radial angle 88 that angles the hole 84 such that airflow is directed radially. In this example, the outboard radial angle 88 is measured between the common centerline 82 and a centerline 94 of the cooling air hole 84.

The adjacent cooling air hole 85 that directs airflow radially outboard includes an outboard radial angle 90 that is disposed between the common centerline 82 and the hole centerline 96. The alternating radial bias angles for each of the cooling air openings 84 and 85 enable more efficient allocation of film cooling air along the common centerline 82 of each row 80.

In this example, each of the cooling air holes 84 and 85 are spaced a substantially equal distance 98 apart from along the entire row 80. It should be understood that the axial spacing 98 between cooling air holes 84, 85 may vary depending on application specific requirements. As appreciated, the disclosed even spacing provides a specific amount of film cooling air over an area of the airfoil. Moreover, in this example, the radial inboard angle 88 and the radial outboard angle 90 are equal although in opposite directions to orientate airflow emitted from the specific cooling air opening 84, 85. Each of the cooling air holes 84 and 85 direct cooling air flow downstream in a direction toward the trailing edge 74.

In this example, each of the cooling air holes 84 and 85 includes a common surface angle 92. The surface angle 92 is commonly defined as that angle between the hole centerline 94, 96 and a top or bottom surface through which the hole extends. It should be appreciated that different surface angles 92 is also within the contemplation of this disclosure.

It should be appreciated that each of the cooling air holes 84, 85 may be either cast within the airfoil or machined after formation of the airfoil. Moreover, although the cooling air holes 84, 85 are illustrated schematically in an airfoil 66, the specific air pattern could be applied to other structures that require cooling air such as static surfaces within the turbine section that utilize film cooling air holes.

Accordingly, the example cooling air orientation and configuration provides improved cooling airflow coverage. The example film air provides cooling air holes that stagger cooling airflow bias above and below a common centerline rather than a common direction to improve airflow coverage and increase cooling efficiencies while limiting the use of cooling air.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A cooled component for a gas turbine engine comprising:
    a plurality of internal ribs extending substantially parallel to a longitudinal axis of the gas turbine engine, the internal ribs disposed within an internal cavity defining cooling air passages within the cooled component; and
    a plurality of cooling holes arranged in rows with axial orientations alternating between a radially outboard bias directing cooling air radially outward and a radially inboard bias directing cooling air radially inward wherein each of the cooling holes extends between an internal opening in communication with one of the cooling air passages and an external opening open to an outer surface of the cooled component,
    wherein the cooling hole crosses over one of the plurality of internal ribs such that the external opening of each of the plurality of cooling holes is disposed on the outer surface such that at least a portion of the external opening is positioned radially outward of a radially facing external side of the one of the plurality of internal ribs relative to the corresponding internal opening.

2. The cooled component as recited in claim 1, wherein cooling holes within each of the rows are disposed along a common centerline.

3. The cooled component as recited in claim 2 wherein an outboard radial bias angle from the common centerline for a radially outboard biased cooling hole is equal and opposite to an inboard radial bias angle relative to the common centerline for a radially inboard biased cooling hole.

4. The cooled component as recited in claim 3, wherein at least two of the plurality of cooling holes are disposed along a common centerline and include a common surface angle.

5. The cooled component as recited in claim 1, wherein the cooled component comprises an airfoil defining a surface between a leading edge and a trailing edge, the airfoil extends radially relative to an engine centerline and the rows extend substantially parallel to the engine centerline.

6. The cooled component as recited in claim 5, wherein the rows are spaced apart radially between a tip of the airfoil and a platform.

7. The cooled component as recited in claim 1, wherein each of the plurality of cooling holes includes a diffuser, and the diffuser for each of the plurality of cooling holes alternate relative to the diffuser of an adjacent one of the plurality of cooling holes between a radially outboard bias and a radially inboard bias corresponding to a bias of the corresponding one of the plurality of cooling holes.

8. The cooled component as recited in claim 7, wherein the diffuser for each corresponding one of the plurality of cooling holes comprises a diverging shape extending outward from the corresponding one of the plurality of cooling holes.

9. The cooled component as recited in claim 1, wherein at least one of the plurality of cooling holes comprises one of a round shape, an oval shape and a rectangular shape.

10. A gas turbine engine comprising;
a turbine section disposed about an engine centerline including a rotating turbine blade and a fixed turbine vane, wherein at least one on the turbine blade and the turbine vane include: an airfoil defining a surface between a leading edge and a trailing edge; a plurality of internal ribs disposed within an internal cavity of the airfoil and extending substantially parallel to a longitudinal axis of the gas turbine engine, the internal ribs defining cooling air passages within the airfoil; and
a plurality of cooling holes arranged in rows with axial orientations alternating between a radially outboard bias directing cooling air radially outward and a radially inboard bias directing cooling air radially inward, wherein each of the plurality of cooling holes extends between an internal opening in communication with one of the cooling air passages and an external opening through the surface of the airfoil,
wherein the cooling hole between the internal opening and the external opening crosses over one of the plurality of ribs such that the external opening breaks through the surface of the airfoil such that at least a portion of the external opening is positioned radially outward of a radially facing external side of the one of the plurality of ribs relative to the corresponding internal opening.

11. The gas turbine engine as recited in claim 10, wherein the cooling holes within each of the rows are disposed along a common centerline.

12. The gas turbine engine as recited in claim 11 wherein an outboard radial bias angle from the common centerline for a radially outboard biased cooling hole is equal and opposite to an inboard radial bias angle relative to the common centerline for a radially inboard biased cooling hole.

13. The gas turbine engine as recited in claim 11, wherein the rows extend substantially parallel to the engine centerline.

14. The gas turbine engine as recited in claim 10, wherein the gas turbine engine further includes a fan driven through a geared architecture by the turbine section.

15. The gas turbine engine as recited in claim 10, including a diffuser extending from each of the plurality of cooling holes, the diffuser extending from the corresponding one of the plurality of cooling holes in a direction alternating between a radially outboard bias and a radially inboard bias corresponding to a bias of the corresponding one of the plurality of cooling holes.

16. The gas turbine engine as recited in claim 10, wherein each of the plurality of cooling holes are comprises one of a round shape, an oval shape and a rectangular shape.

17. A method of fabricating a turbine airfoil including:
forming an airfoil including a pressure side and a suction side that extends between a leading edge and a trailing edge;
forming an internal cavity for cooling air flow including axially extending internal ribs defining cooling air passages;
forming holes within the airfoil in a row extending from the leading edge toward the trailing edge along a common centerline, wherein each of the holes extends between an internal opening in communication with a cooling air passage and an external opening open to an outer surface of the airfoil,
wherein the hole crosses over one of the plurality of internal ribs such that the external opening is formed such that at least a portion of the external opening is positioned radially outward of a radially facing external side of the one of the plurality of internal ribs relative to the internal opening; and
angling holes within each row to alternate a radial bias of cooling airflow above and below the common centerline.

18. The method as recited in claim 17, including forming external openings with an outboard radial bias angle directing airflow above the common centerline adjacent to an external opening with an inboard radial bias angle directing airflow below the common centerline.

19. The method as recited in claim 18, including forming a plurality of rows spaced radially apart between a platform of the airfoil and a tip of the airfoil.

20. The method as recited in claim 18, including forming at least two holes within one of the rows to include a common radial bias angle.

* * * * *